United States Patent
Crahen et al.

(10) Patent No.: US 11,121,869 B1
(45) Date of Patent: Sep. 14, 2021

(54) DECENTRALIZED CRYPTOGRAPHIC KEY DERIVATION

(71) Applicant: Amazon Technologies, Inc., Seattle, WA (US)

(72) Inventors: Eric Crahen, Seattle, WA (US); Krutarth Mukesh Gathani, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/870,447

(22) Filed: May 8, 2020

(51) Int. Cl.
  *H04L 29/06* (2006.01)
  *H04L 9/08* (2006.01)
  *G06F 9/54* (2006.01)
  *H04L 9/32* (2006.01)

(52) U.S. Cl.
  CPC ............ *H04L 9/0866* (2013.01); *G06F 9/547* (2013.01); *H04L 9/088* (2013.01); *H04L 9/0819* (2013.01); *H04L 9/3242* (2013.01)

(58) Field of Classification Search
  CPC ... H04L 9/0866; H04L 9/0861; H04L 9/0819; H04L 9/088; H04L 9/3242; H04L 9/321; H04L 63/0428; H04L 9/0816; H04L 9/08; G06F 9/547; G06F 9/14; H04N 7/1675
  See application file for complete search history.

(56) References Cited

U.S. PATENT DOCUMENTS

| | | | |
|---|---|---|---|
| 2007/0297607 A1* | 12/2007 | Ogura | H04N 7/1675 380/239 |
| 2019/0089696 A1* | 3/2019 | Kim | H04L 63/0876 |
| 2019/0238795 A1* | 8/2019 | Chen | H04N 21/63345 |

* cited by examiner

*Primary Examiner* — Yogesh Paliwal
(74) *Attorney, Agent, or Firm* — Athorus, PLLC

(57) ABSTRACT

Cryptographic keys are generated for components of a distributed system in a decentralized manner. A root key is generated for a universe of components, including capturing data and components for processing the data. A cryptographic key for a processing component is derived from the root key and one or more attributes or identifiers of the processing component, which may be provided in a specific region or domain. Cryptographic keys for capturing components (e.g., cameras) within the region or domain are derived from the cryptographic keys of the processing component and one or more attributes or identifiers of the respective capturing components. The capturing components encrypt data using their respective cryptographic keys and transfer the encrypted data to the processing component, which re-derives the cryptographic keys for such capturing components and decrypts the encrypted data using the re-derived cryptographic keys.

20 Claims, 12 Drawing Sheets

PROCESSING COMPONENT DERIVES DEVICE KEYS FOR CONNECTED CAMERAS BASED ON INTERMEDIATE KEY

PROCESSING COMPONENT RE-DERIVES DEVICE KEYS TO DECRYPT ENCRYPTED DATA RECEIVED FROM CAMERAS

DECENTRALIZED CRYPTOGRAPHIC KEY DERIVATION

BACKGROUND

In distributed systems, cryptographic keys (or "encryption keys" or "decryption keys") for encryption or decryption of data are typically managed and provided to various components of such systems in a centralized manner. A server or other computer system in communication with the various components of a distributed network may generate and distribute cryptographic keys to such components, while also managing the use of such keys in encrypting or decrypting data, while also storing and rotating or revoking such keys, as necessary. By properly and securely managing cryptographic keys, a distributed system may ensure that access to sensitive information or data is properly limited to authorized users, and controlled from a single, centralized location. Some examples of distributed computing systems that encrypt or decrypt information or data using cryptographic keys include, but are not limited to, telecommunications systems, database management systems, gaming systems (e.g., multiplayer gaming systems), camera networks, vehicle management systems, electronic commerce systems, or others.

Recently, advancements in technology have enabled the development of distributed systems with ever-smaller components that are configured to communicate according to an increasing number of protocols, standards or techniques. Today, a wide variety of machines or devices such as appliances, automobiles, cellular telephones, computers, glasses, luggage and wristwatches, and many others, may be equipped with systems that enable such machines or devices to instantly communicate with one another via any number of wireless technologies. The rapid onset of small, versatile components has contributed to the growth of a phenomenon known as the "Internet of Things," a theory that any type or form of object may be connected to an underlying network of systems or sensors and configured to exchange information or data between one another.

The interconnectedness of machines or devices has had a profound impact on security, however, as the exponential growth of network-enabled systems has led to a corresponding increase in the demand for secure communications. Traditional methods for deriving cryptographic keys, however, may be incapable of keeping up with the increased demand, and may subject entire networks of machines to risk of loss in the event of a breach or loss of secure control of data by any one machine or device.

DETAILED DESCRIPTION

Figure 1A:
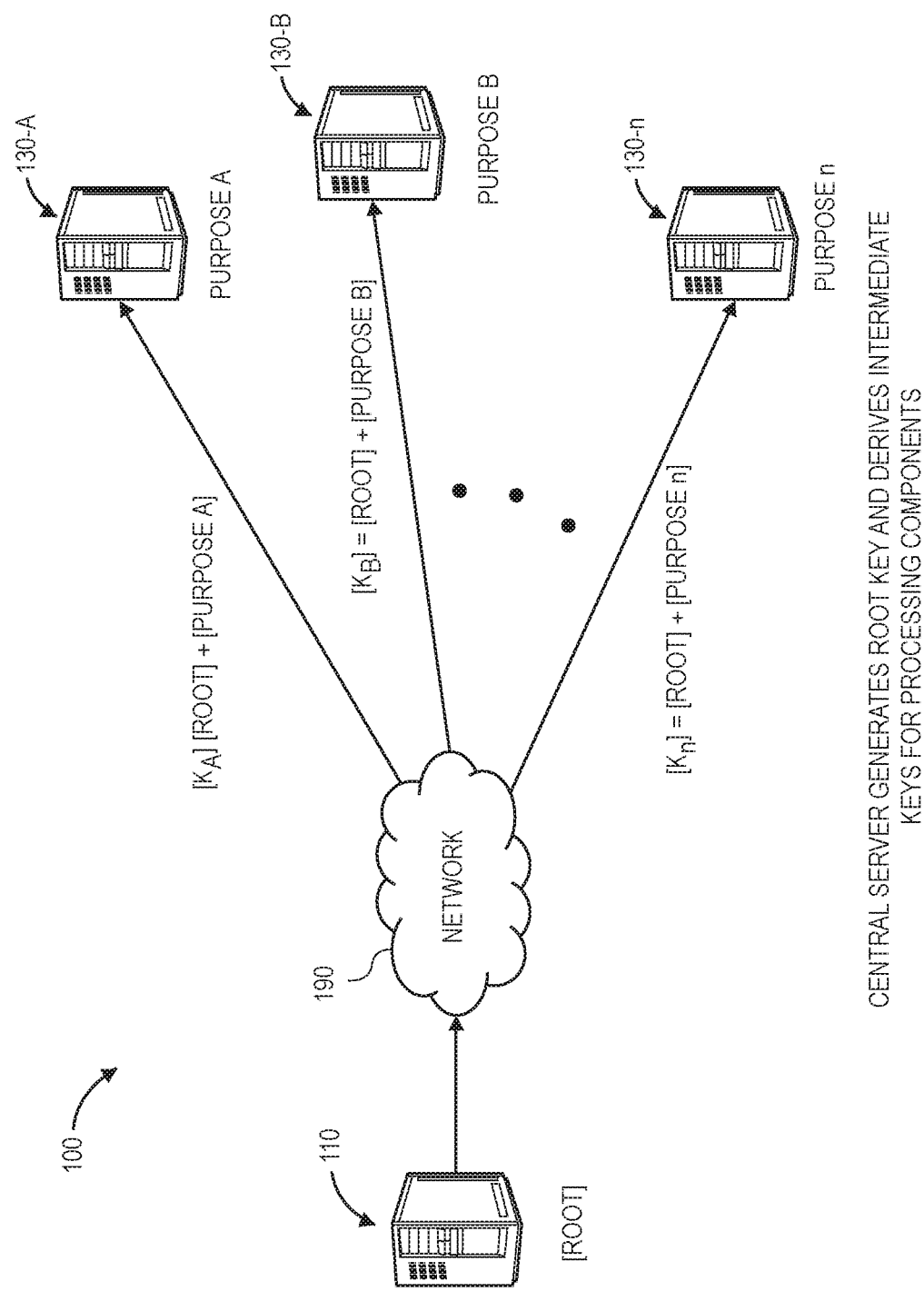
FIGS. 1A through 1E are views of aspects of one system for cryptographic key derivation in accordance with implementations of the present disclosure.

As is set forth in greater detail below, the present disclosure is directed to the derivation of cryptographic keys for use in encrypting or decrypting information or data in distributed systems. More specifically, the present disclosure is directed to systems and methods for deriving cryptographic keys for devices or components that are configured to capture sensitive data, and for devices or components that are configured or programmed to process the sensitive data, based not only on a root key associated with a universe of such components, but also physical, virtual or temporal attributes of such components. In some implementations, an "intermediate key," or a cryptographic key associated with a data processing component that is associated with any number of data capture components, such as cameras, microphones or other systems, may be derived based on a root key generated by a management system along with one or more attributes or identifiers of the processing component or the various data capture components. Such attributes or identifiers may include, but need not be limited to, an identifier of a purpose for which the processing component is provided, one or more vectors or other strings for increasing a level of entropy of the intermediate key, values associated with a time at which the intermediate key will be valid or a duration for which the intermediate key is to remain valid, or identifiers of physical or virtual locations or domains of the processing component or the data capture components, or others. Similarly, "device keys" or "component keys," or cryptographic keys associated with data capture components that are configured to capture and encrypt any type of data, may be derived based on an intermediate key of a data processing component with which the data capture components are associated, along with one or more attributes or identifiers of the respective data capture components.

The systems and methods disclosed herein may be utilized to derive and distribute cryptographic keys for a theoretically unlimited number of components that are valid or effective for any duration, and such cryptographic keys need not be stored in any one common physical or virtual location. A cryptographic key may be derived or re-derived for a given component with minimal information regarding a state of the given component in accordance with implementations of the present disclosure, and regardless of whether the component is connected to a management system that generated a root key from which the cryptographic key was directly or indirectly derived. The systems and methods disclosed herein may ensure that data captured by one or more components of a distributed system, and processed by one or more other components of the distributed system, may be securely stored and processed at a granular level ensuring that a breach or loss of secure control of data at or by one component of the distributed system does not infect all of the components of the distributed system.

Referring to FIGS. 1A through 1E, a system 100 for cryptographic key derivation in accordance with implementations of the present disclosure is shown. The system 100 includes a server 110 (or other computer system) connected to a plurality of processing components 130-A, 130-B . . . 130-n over a network 190, which may include the Internet in whole or in part. The processing components 130-A, 130-B . . . 130-$n$ may be any type or form of computer devices or systems, including not only servers but also desktop computers, laptop computers, tablet computers (or other mobile devices), or any other computer devices or systems, which may be provided in a common physical location with the server 110, in a common location with one another, or in different physical locations from the server 110 or one another. As is shown in FIG. 1A, each of the processing components 130-A, 130-B . . . 130-$n$ is programmed or otherwise configured to perform a discrete purpose, viz., Purpose A, Purpose B and Purpose n, respectively. For example, the processing component 130-A may be programmed or configured to process one type or form of data, e.g., imaging data, acoustic data, messages, or other data, while the processing components 130-B . . . 130-$n$ may be programmed or configured to process one or more other types or forms of data. Alternatively, two or more of the processing components may be programmed or otherwise configured to perform a common purpose.

In accordance with implementations of the present disclosure, the derivation of cryptographic keys for the various components of a distributed system may begin with the generation of a root key associated with each of such components. For example, as is shown in FIG. 1A, the server 110 may operate a management system, e.g., by executing one or more applications or programs, that generates a root key, viz., [ROOT]. The root key [ROOT] may be a sufficiently long string of alphanumeric characters that is randomly generated by the management system, which may be a set of applications or programs that are native or proprietary to the server 110, or may be generated by one or more third parties to the server 110. The root key [ROOT] may be securely stored on the server 110 in any manner, and in some implementations, the root key [ROOT] may have a length of thirty-two raw bytes or more.

Additionally, as is also shown in FIG. 1A, the server 110 may further derive intermediate keys $[K_A], [K_B] \ldots [K_n]$ for the various processing components 130-A, 130-B . . . 130-$n$. The intermediate keys $[K_A], [K_B] \ldots [K_n]$ may be derived based on both the root key [ROOT], and one or more attributes or identifiers of the respective processing components 130-A, 130-B . . . 130-$n$, and distributed to the respective processing components 130-A, 130-B . . . 130-$n$ according to a secure (e.g., access-controlled or encrypted) connection such as a Secure Sockets Layer ("SSL") or Transport Layer Security ("TLS") connection.

For example, in some implementations, the management system or other applications or programs executed by the server 110 may perform a hash function (or another cryptographic function) on the root key [ROOT] and one or more strings or other sets of characters identifying or otherwise associated with the respective purposes of the respective processing components 130-A, 130-B . . . 130-$n$. The intermediate keys $[K_A], [K_B] \ldots [K_n]$ for such components may be derived based on outputs received from the respective functions. In some implementations, hash functions, such as hash-based message activation code functions, may be preferred for deriving cryptographic keys from other cryptographic keys and attributes or identifiers of components, to the extent that such functions are irreversible in nature, that such functions reduce the likelihood of collisions (e.g., where two different inputs result in the same output), or that such functions increase a level of entropy associated with an output. Additionally, in some implementations, the root key [ROOT], or the intermediate keys $[K_A], [K_B] \ldots [K_n]$ may be derived therefrom, at a designated time in a given day or on a designated day of a given week or month, or in accordance with a predetermined schedule or interval, such as at a designated time in a given day.

Alternatively, or additionally, in some implementations, the hash functions (or other cryptographic functions) may consider any other information or data in the derivation of the intermediate keys $[K_A], [K_B] \ldots [K_n]$ for the processing components 130-A, 130-B . . . 130-$n$, including but not limited to additional strings or other sets of characters for incorporating entropy into the intermediate keys $[K_A], [K_B] \ldots [K_n]$, or enhancing a level of entropy of the intermediate keys $[K_A], [K_B] \ldots [K_n]$, such as an initialization vector, as well as additional strings or functions including identifiers or labels of dates or times at which the intermediate keys $[K_A], [K_B] \ldots [K_n]$ were generated or for which the intermediate keys $[K_A], [K_B] \ldots [K_n]$ will remain valid. In some other implementations, the hash functions (or other cryptographic functions) may consider identifiers of physical locations of the processing components 130-A, 130-B . . . 130-$n$ (e.g., buildings, structures or other facilities, or locations of such buildings, structures or other facilities), or hierarchical identifiers of the data processing component, as well as physical locations or hierarchical identifiers of other components (e.g., classes of such components) with which the processing components 130-A, 130-B . . . 130-$n$ may be associated, in deriving the intermediate keys $[K_A], [K_B] \ldots [K_n]$.

Figure 1B:
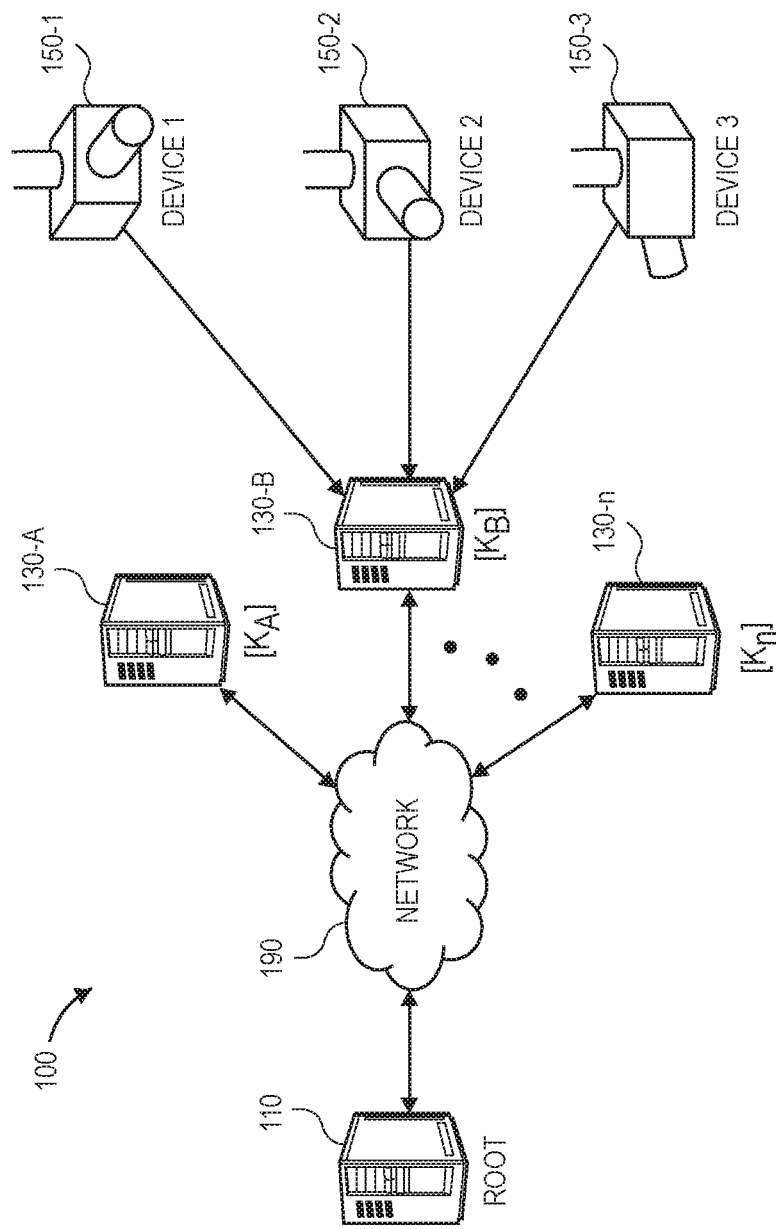

As is shown in FIG. 1B, a plurality of cameras 150-1, 150-2, 150-3 are connected to the processing component 130-B. For example, the cameras 150-1, 150-2, 150-3 may be physically connected to the processing component 130-B, e.g., by one or more wires or other connectors, or wirelessly connected to the processing component 130-B, e.g., over one or more networks, such as the network 190, or one or more peer-to-peer networks. The cameras 150-1, 150-2, 150-3 may be programmed or instructed to connect to the processing component 130-B by one or more human operators, or by one or more automated processes, e.g., start-up, boot, or initialization procedures, or in any other manner. The cameras 150-1, 150-2, 150-3 may include one or more sensors for capturing imaging data (e.g., visual images, depth images, or any other type or form of images), as well as any audio signals or other information, data or metadata, and any processors, transceivers or other components for controlling the operation of the respective cameras 150-1, 150-2, 150-3, or for communicating with one or more other devices or components, e.g., the processing component 130-B.

In some implementations, the processing component 130-B and the cameras 150-1, 150-2, 150-3 may be provided in or in association with a common physical location, e.g., a building, a structure or another facility, such as a materials handling facility, and configured to securely, capture, process or store sensitive data relating to operations within or around the building, the structure or the other facility. Alternatively, or additionally, any other type or form of data capture components (e.g., microphones or other sensors) may be connected to the processing component 130-B, or to any of the processing components 130-A, 130-B . . . 130-$n$. Moreover, the cameras 150-1, 150-2, 150-3 or any other data capture components may be connected to the processing component 130-B, or to any of the processing components 130-A, 130-B . . . 130-$n$, either prior to, during or after the generation of the root key [ROOT] by the management system or other applications or programs by the server 110.

Figure 1C:
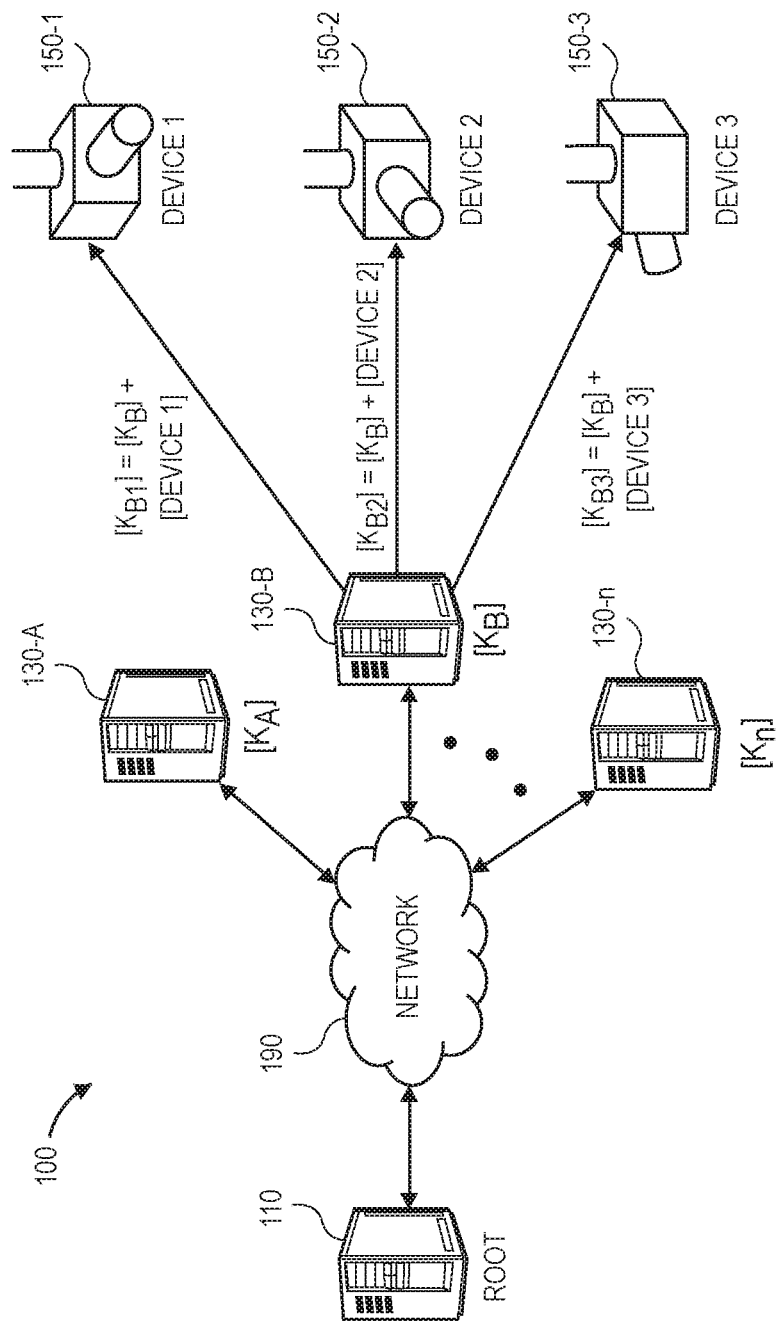

As is shown in FIG. 1C, after the cameras 150-1, 150-2, 150-3 are connected to the processing component 130-B, device keys (or component keys) $[K_{B1}], [K_{B2}], [K_{B3}]$, may be derived for each of the respective cameras 150-1, 150-2, 150-3 based on the intermediate key [$K_B$] derived for the processing component 130-B. In some implementations, the device keys [$K_{B1}$], [$K_{B2}$], [$K_{B3}$] may be derived by performing a hash function (or another cryptographic function) on the intermediate key [$K_B$] derived for the processing component 130-B, and one or more strings or other sets of characters identifying the respective cameras 150-1, 150-2, 150-3, e.g., [DEVICE1], [DEVICE2], [DEVICE3], which may include but are not limited to labels, tags, serial numbers, or other identifiers associated with such cameras 150-1, 150-2, 150-3, which may be selected for any reason and on any basis. In some implementations, the hash function (or other cryptographic function) may be the same function by which the intermediate key [$K_B$] was derived, or another function. Alternatively, or additionally, the hash function (or other cryptographic function) may further consider any other information or data in the derivation of the device keys [$K_{B1}$], [$K_{B2}$], [$K_{B3}$] for the cameras 150-1, 150-2, 150-3, including but not limited to additional strings or other sets of characters for incorporating entropy into the device keys [$K_{B1}$], [$K_{B2}$], [$K_{B3}$], or enhancing a level of entropy of the device keys [$K_{B1}$], [$K_{B2}$], [$K_{B3}$], e.g., an initialization vector, as well as additional strings or functions including identifiers or labels of dates or times at which the device keys [$K_{B1}$], [$K_{B2}$], [$K_{B3}$] were generated or for which the device keys [$K_{B1}$], [$K_{B2}$], [$K_{B3}$] will remain valid. In some other implementations, the hash functions (or other cryptographic functions) may consider identifiers of physical locations of the cameras 150-1, 150-2, 150-3 (e.g., specific locations within a building, a structure or another facility), or hierarchical identifiers of the cameras 150-1, 150-2, 150-3, or any others.

Moreover, in some implementations, the processing component 130-B may derive the device keys [$K_{B1}$], [$K_{B2}$], [$K_{B3}$] for the respective cameras 150-1, 150-2, 150-3 from the intermediate key [$K_B$] at a designated time in a given day, or on a designated day of a given week or month, or in accordance with a predetermined schedule or interval. For example, in some implementations, the processing component 130-B may derive the device keys [$K_{B1}$], [$K_{B2}$], [$K_{B3}$] at the same time, or in accordance with the same schedule or interval, that the server 110 or management system generates the root key [ROOT] or derives one or more of the intermediate keys [$K_A$], [$K_B$] . . . [$K_n$]. In some other implementations, however, the processing component 130-B may derive the device keys [$K_{B1}$], [$K_{B2}$], [$K_{B3}$] at different times, or in accordance with different schedules or intervals. For example, where the server 110 or management system generates the root key [ROOT] or derives the intermediate keys [$K_A$], [$K_B$] . . . [$K_n$] on one schedule or interval (e.g., once daily), the processing component 130-B may derive the device keys [$K_{B1}$], [$K_{B2}$], [$K_{B3}$] on a sub-schedule or sub-interval that is shorter than the interval (e.g., once every minute, five minutes, ten minutes, thirty minutes or sixty minutes) at which the root key [ROOT] was generated or the intermediate keys [$K_A$], [$K_B$] . . . [$K_n$] were derived, e.g., based on a then-valid or the then-prevailing root key [ROOT] or a then-valid or then-prevailing intermediate key [$K_B$].

Additionally, although not shown in FIG. 1B or 1C, any other number of data capture components, including but not limited to cameras, may be connected to one or more of the processing components 130-A, 130-B . . . 130-n.

Figure 1D:
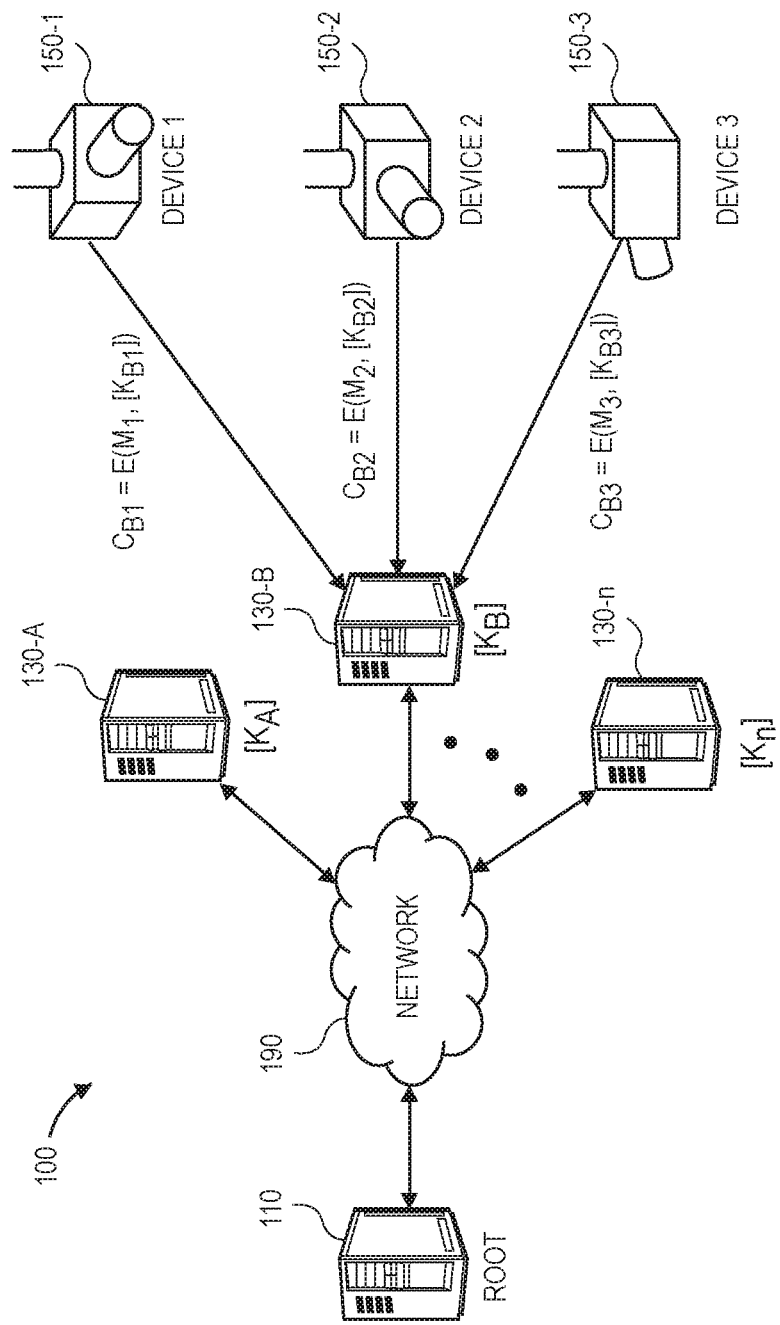

As is shown in FIG. 1D, the cameras 150-1, 150-2, 150-3 begin to capture data, and to encrypt the data using their respectively derived device keys [$K_{B1}$], [$K_{B2}$], [$K_{B3}$]. In some implementations, the cameras 150-1, 150-2, 150-3 capture imaging data (e.g., visual or depth images) from their respective fields of view, along with acoustic data (e.g., sound signals), electronic messages, or any other information or data, at any interval. After the cameras 150-1, 150-2, 150-3 capture the data, or simultaneously as the data is captured, the data may be encrypted using their respectively assigned device keys, as shown by the relation $C_i = E(M_i, [K_{Bi}])$, where $C_i$ is the data encrypted by a device i, e.g., a ciphertext (or cipher data), E is an encryption function, $M_i$ is the data captured by the device i, and $K_i$ is an encryption key derived for the device i. For example, in some implementations, the cameras 150-1, 150-2, 150-3 capture data $M_{B1}$, $M_{B2}$, $M_{B3}$, and encrypt the data $C_{B1} = E(M_{B1}, [K_{B1}])$, $C_{B2} = E(M_{B2}, [K_{B2}])$, $C_{B3} = E(M_{B3}, [K_{B3}])$, e.g., according to an envelope encryption scheme, or any other type or form of encryption scheme, and store the encrypted data $C_{B1}$, $C_{B2}$, $C_{B3}$ in association with one or more metadata parameters before transmitting the encrypted data $C_{B1}$, $C_{B2}$, $C_{B3}$ to the processing component 130-B.

Figure 1E:
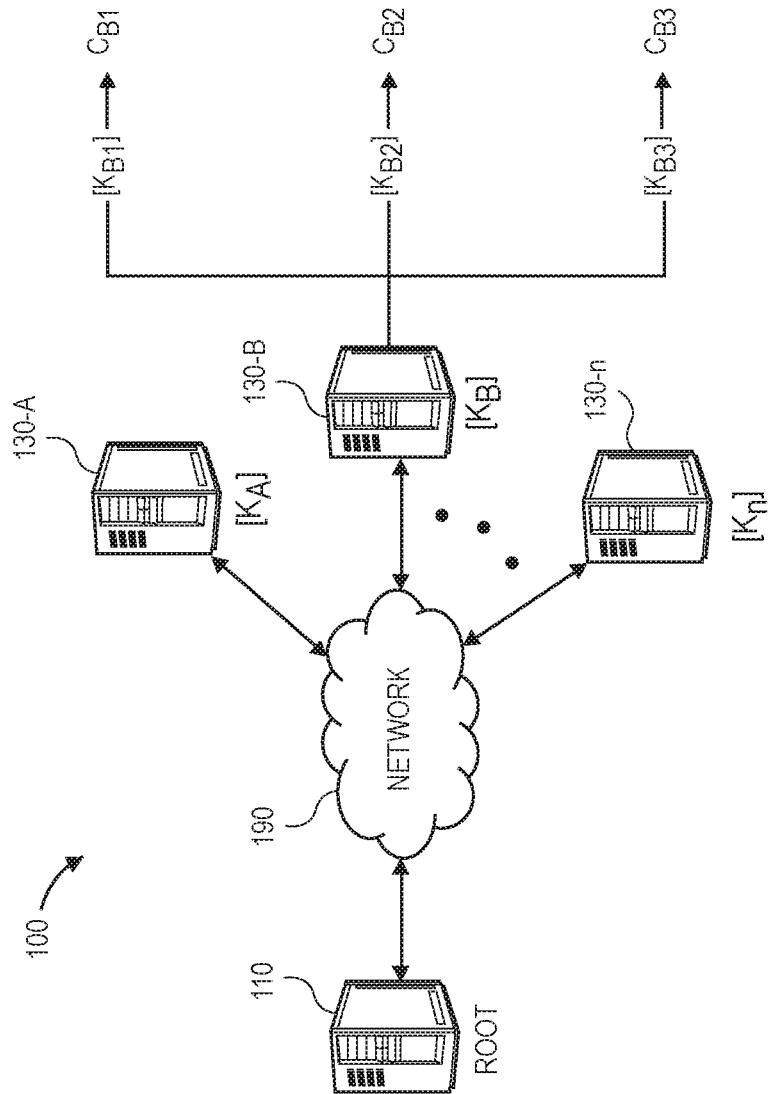

As is shown in FIG. 1E, upon receiving the encrypted data $C_{B1}$, $C_{B2}$, $C_{B3}$ from the respective cameras 150-1, 150-2, 150-3, the processing component 130-B derives the device keys [$K_{B1}$], [$K_{B2}$], [$K_{B3}$] again based on the intermediate key [$K_B$] and the identifiers of the respective cameras 150-1, 150-2, 150-3, viz., [DEVICE1], [DEVICE2], [DEVICE3], or any other attributes or identifiers associated with such cameras 150-1, 150-2, 150-3, from which the device keys [$K_{B1}$], [$K_{B2}$], [$K_{B3}$] were originally derived. For example, in some implementations, the encrypted data $C_{B1}$, $C_{B2}$, $C_{B3}$ may be accompanied by metadata (e.g., one or more parameters) identifying the cameras 150-1, 150-2, 150-3 from which the encrypted data $C_{B1}$, $C_{B2}$, $C_{B3}$ was received, or an association between a respective one of the cameras 150-1, 150-2, 150-3 and the processing component 130-B. After re-deriving the device keys [$K_{B1}$], [$K_{B2}$], [$K_{B3}$], the processing component 130-B decrypts the encrypted data $C_{B1}$, $C_{B2}$, $C_{B3}$ using the keys [$K_{B1}$], [$K_{B2}$], [$K_{B3}$], and processes the encrypted data $C_{B1}$, $C_{B2}$, $C_{B3}$ for any purpose, e.g., image processing, object detection or recognition, acoustic processing, cybersecurity, fraud detection, finance, medicine, or others.

Figure 2:
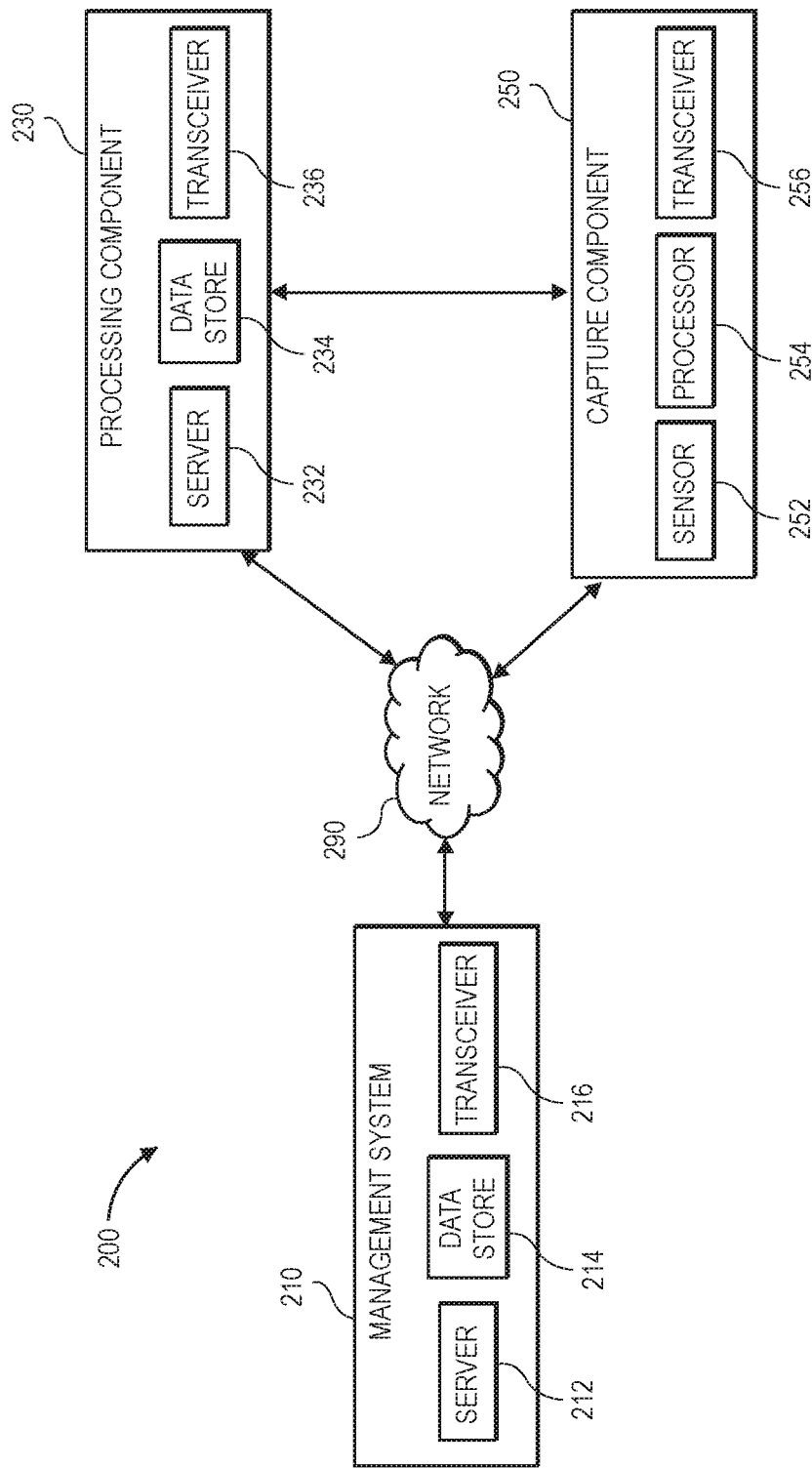
FIG. 2 is a block diagram of components of one system for cryptographic key derivation in accordance with implementations of the present disclosure.

Referring to FIG. 2, a block diagram of one system 200 for cryptographic key derivation in accordance with implementations of the present disclosure is shown. The system 200 includes a management system 210, a processing component 230 and a capture component 250 that are connected to one another over a network 290, which may include the Internet in whole or in part. Except where otherwise noted, reference numerals preceded by the number "2" in FIG. 2 refer to elements that are similar to elements having reference numerals preceded by the number "1" shown in FIGS. 1A through 1E.

As is shown in FIG. 2, the management system 210 may be any device or system that may include one or more physical computer servers 212 having one or more computer processors and any number of data stores 214 (e.g., databases) associated therewith, as well as one or more transceivers 216. The servers 212, the data stores 214 and/or the transceivers 216 of the management system 210 may be provided for any specific or general purpose. For example, the management system 210 may be independently provided in connection with one or more physical or virtual services for the exclusive purposes of generating root keys and deriving or administering cryptographic keys. Alternatively, the management system 210 may be provided for such purposes and one or more other purposes. For example, in some implementations, the management system 210 may be configured to receive information or data from one or more of the processing component 230 or the capture component 250.

The servers 212 may include any type of computing device, including but not limited to a network computer, a cloud computing device, a mainframe computer, or any like computing system or machine. In some implementations, the servers 212 may comprise a cluster, cloud, farm, or other grouping of multiple devices that coordinate operations to provide load balancing, failover support, parallel processing capabilities, shared storage resources, or other aspects. The data stores 214 may be any storage devices or media for storing information or data thereon, and may, in some implementations, be embodied in non-volatile memory, such as flash, magnetic, or optical rewritable non-volatile memory.

The management system 210 may also connect to or otherwise communicate with the network 290 through the sending and receiving of digital data. For example, the management system 210 may include any facilities, stations or locations having the ability or capacity to receive and store information or data, such as media files, from one another, or from one or more other external computer systems (not shown) via the network 290. In some embodiments, the management system 210 may be provided in a physical location. In other such embodiments, the management system 210 may be provided in one or more alternate or virtual locations, e.g., in a "cloud"-based environment. In still other embodiments, the management system 210 may be provided onboard one or more moving vehicles (e.g., aerial vehicles or ground vehicles).

The transceivers 216 may be configured to enable the management system 210 to receive or transmit information or data to or from any of the processing component 230 or the capture component 250, or any other device or component, over the network 290, according to secure (e.g., access-controlled or encrypted) connections such as an SSL or TLS connection. For example, the transceivers 216 may be configured to communicate through one or more wired or wireless means, e.g., wired technologies such as Universal Serial Bus (or "USB") or fiber optic cable, or standard wireless protocols, standards or specifications such as Bluetooth® or any Wireless Fidelity ("Wi-Fi") protocol, such as over the network 290 or directly. In some implementations, the transceivers 216 may be configured to communicate according to the 802.11 family of protocols, standards or specifications for Wi-Fi communications over one or more networks (e.g., local area networks). The transceivers 216 may perform any necessary protocol, timing or other data transformations in order to convert data signals from a first format suitable for use by one component into a second format suitable for use by another component. For example, in some implementations, the transceivers 216 may include support for devices attached through various types of peripheral buses, e.g., variants of the Peripheral Component Interconnect ("PCI") bus standard or the USB standard. In some other implementations, functions of the transceivers 216 may be split into two or more separate components, or incorporated directly into the server 212. Additionally, the transceivers 216 may be configured to operate or perform any type of encryption and on any basis.

As is also shown in FIG. 2, the processing component 230 may also be any computer device or system that may include one or more servers 232, data stores 234 or transceivers 236. The servers 232, the data stores 234 or and the transceivers 236 may have one or more of the same qualities, features or attributes as the servers 212, the data stores 214 or the transceivers 216, described above, or one or more other qualities, features or attributes. Alternatively, the processing component 230 may be or reside on any other type or form of computer device or system, e.g., a desktop computer, a tablet computer, a laptop computer, a smartphone, a personal digital assistant, a digital media player, an electronic book reader, a set-top box, a television, an appliance or an automobile, as well as a wearable computer device such as a pair of augmented reality glasses or a wristwatch. The processing component 230 may include any form of input and/or output peripherals such as scanners, readers, keyboards, keypads, touchscreens or pointing devices, and need not include a server, a data store or a transceiver.

The processing component 230 may be provided for any specific or general purpose. For example, the processing component 230 may be independently provided in connection with one or more physical or virtual services for the exclusive purposes of receiving or deriving cryptographic keys and processing data captured by the capture component 250. Alternatively, the processing component 230 may be provided for such purposes and one or more other purposes. For example, the processing component 230 may be configured to receive, process or store any type or form of information or data from one or more of the management system 210 or the capture component 250. In some implementations, the processing component 230 may be configured to train or operate one or more machine learning tools, algorithms or techniques to perform tasks based on data captured by the capture component 250 and/or one or more sets of rules associated with such tasks, including but not limited to applications in image processing, object detection or recognition, acoustic processing, cybersecurity, fraud detection, finance, medicine, or others. For example, in some implementations, the processing component 230 may be configured to process one or more images captured by the capture component 250 to detect or recognize one or more objects depicted therein. In some other implementations, the processing component 230 may be further configured to process one or more acoustic signals captured by the capture component 250 to interpret one or more sounds (e.g., spoken words) expressed therein, or to identify a source of the one or more sounds. Any type or form of data may be captured by the capture component 250, encrypted, provided to the data processing component 230, decrypted, and processed according to any technique in accordance with implementations of the present disclosure.

In some implementations, the servers 212, 232 may have enhanced security measures or features (e.g., physical or virtual) that enable information or data to be stored thereon at a higher level of security or with greater confidence. For example, one or more of the servers 212, 232 may be located in a physically secure structure or building, or may have restricted virtual access via a firewall, virtual personal network (or "VPN") or like barrier, with one or more monitoring systems for tracking and recording access to the servers 212, 232, or attempts to access the servers 212, 232. Additionally, the servers 212, 232 may be programmed or otherwise configured to execute any type or form of function or application on information or data, including but not limited to any cryptographic functions, e.g., hash functions, message application code functions, or any other functions.

The capture component 250 may be any device or system that is configured to capture information or data of any type or form. As is shown in FIG. 2, the capture component 250 includes one or more sensors 252, one or more processors 254 and one or more transceivers 256. The sensors 252 may be configured to capture information or data of any type or form. The processors 254 may be configured to execute any applications or functions on the information or data captured thereby, including but not limited to encrypting the information or data, e.g., using a cryptographic key (e.g., a device key or a component key) derived from a cryptographic key associated with the processing component 230. The transceivers 256 may have one or more of the same qualities, features or attributes as the transceivers 216, 236, described above, or one or more other qualities, features or attributes.

In some implementations, the capture component 250 may be configured to capture any type or form of imaging data, e.g., an imaging device such as a visual camera, a range camera, a depth camera, an infrared camera, a radiographic camera, or the like. In such implementations, the sensors 252 may have single elements or a plurality of photoreceptors or photosensitive components (e.g., a CCD sensor, a CMOS sensor, or another sensor), which may be typically arranged in an array, as well as any number of chips, electrodes, clocks, boards, timers or other relevant features. Light reflected from objects within a field of view of the capture component 250 may be captured by the sensor 252, and quantitative values, e.g., image pixels, may be assigned to one or more aspects of the reflected light.

In some implementations, the capture component 250 may be configured to capture any type or form of sounds or other acoustic signals. In such implementations, the sensor 252 may be any type or form of acoustic sensor, such as a microphone, a piezoelectric sensor, a vibration sensor or another transducer for detecting and recording acoustic energy from one or more directions.

In some implementations, the capture component 250 may be configured to receive electronic messages transmitted or received by members of a group, a company, a social network, or other collection of users, and to process such electronic messages to determine whether any of such messages contain harmful, objectionable, confidential or unauthorized content. In such instances, the sensor 252 may be any type or form of client, application or service for filtering data such as E-mail messages, calendar event messages, short messaging service or multimedia messaging service ("SMS" or "MMS") text messages, instant messages, bulletin board system (BBS) messages, or the like. The capture component 250 may also generate one or more electronic messages, e.g., a trouble ticket or issue report, and direct the electronic messages to any number of recipients. Data captured by the capture component 250 may comprise text, embedded images or other multimedia, and/or one or more attachments.

In some implementations, the capture component 250 may be configured to capture any information or data, other than imaging data, acoustic signals or messages. In such implementations, the sensor 252 may be a position sensor (e.g., a Global Positioning System transceiver), an accelerometer, a gyroscope, an altimeter (e.g., a pressure altimeter, a sonic altimeter and/or a radar altimeter), a speedometer (e.g., an anemometer), a thermometer, a barometer, a hygrometer, an air monitoring sensor (e.g., oxygen, ozone, hydrogen, carbon monoxide or carbon dioxide sensor), an infrared sensor, a pH sensor, a magnetic anomaly detector, a metal detector, a radiation sensor (e.g., Geiger counters, neutron detectors, alpha detectors), an attitude indicator, a depth gauge or any other type or form of sensor.

The processing component 230 and the data capture component 250 may be associated with any building, structure or facility, such as a materials handling facility, and configured to securely, capture, process or store sensitive data relating to any operations within or around the building, the structure or the facility.

The network 290 may be any wired network, wireless network, or combination thereof, and may comprise the Internet in whole or in part. In addition, the network 290 may be one or more of a personal area network, local area network, wide area network, cable network, satellite network, cellular telephone network, or combination thereof. The network 290 may also be a publicly accessible network of one or more linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Those of ordinary skill in the pertinent arts will understand that process steps described herein as being performed by a "management system," a "processing component," or a "capture component," or like terms, may be automated steps performed by their respective computer systems, or implemented within software modules (or computer programs) executed by one or more general purpose computers. Moreover, process steps described as being performed by a "management system," a "processing component," or a "capture component," or like terms, may be typically performed by a human operator, but could, alternatively, be performed by an automated agent.

The data and/or computer-executable instructions, programs, firmware, software and the like (also referred to herein as "computer-executable" components) described herein may be stored on a transitory or non-transitory computer-readable medium that is within or accessible by computers or computer components such as the servers 212, 232, the data stores 214, 234, the transceivers 216, 236, 256, the processors 254, or any other computers or control systems utilized by the management system 210, the processing component 230 or the capture component 250, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/ machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the system 200 of FIG. 2 includes a single box corresponding to the management system 210, a single box corresponding to the processing component 230, and a single box corresponding to the capture component 250, those of ordinary skill in the pertinent arts will recognize that any number or type of management systems, processing components or capture components may be operated in accordance with the present disclosure, including but not limited to computers, cameras, or other devices having one or more sensors. In some implementations, the system 200 may include dozens or even hundreds of capture components 250 of any type or form.

As is discussed above, cryptographic keys may be generated for data capture components (e.g., cameras or other systems), and for data processing components, in a decentralized manner. A cryptographic key (e.g., a decryption key) may be generated for a data processing component based on a root key or other key generated by a central server to which the data processing component is connected. Subsequently, or in parallel, cryptographic keys (e.g., encryption keys) may be generated for data capture components that are associated with the data processing component based on the cryptographic key generated for the data processing component, which is enabled to decrypt data captured by any of the data capture components. For example, when a data capture component encrypts data using a cryptographic key derived by a data processing component, and transmits the encrypted data along with metadata identifying the data capture component to the data processing component, the data processing component may derive the cryptographic key again based on its own cryptographic key and an identifier of the data capture component, and decrypt the encrypted data accordingly.

Figure 3A:
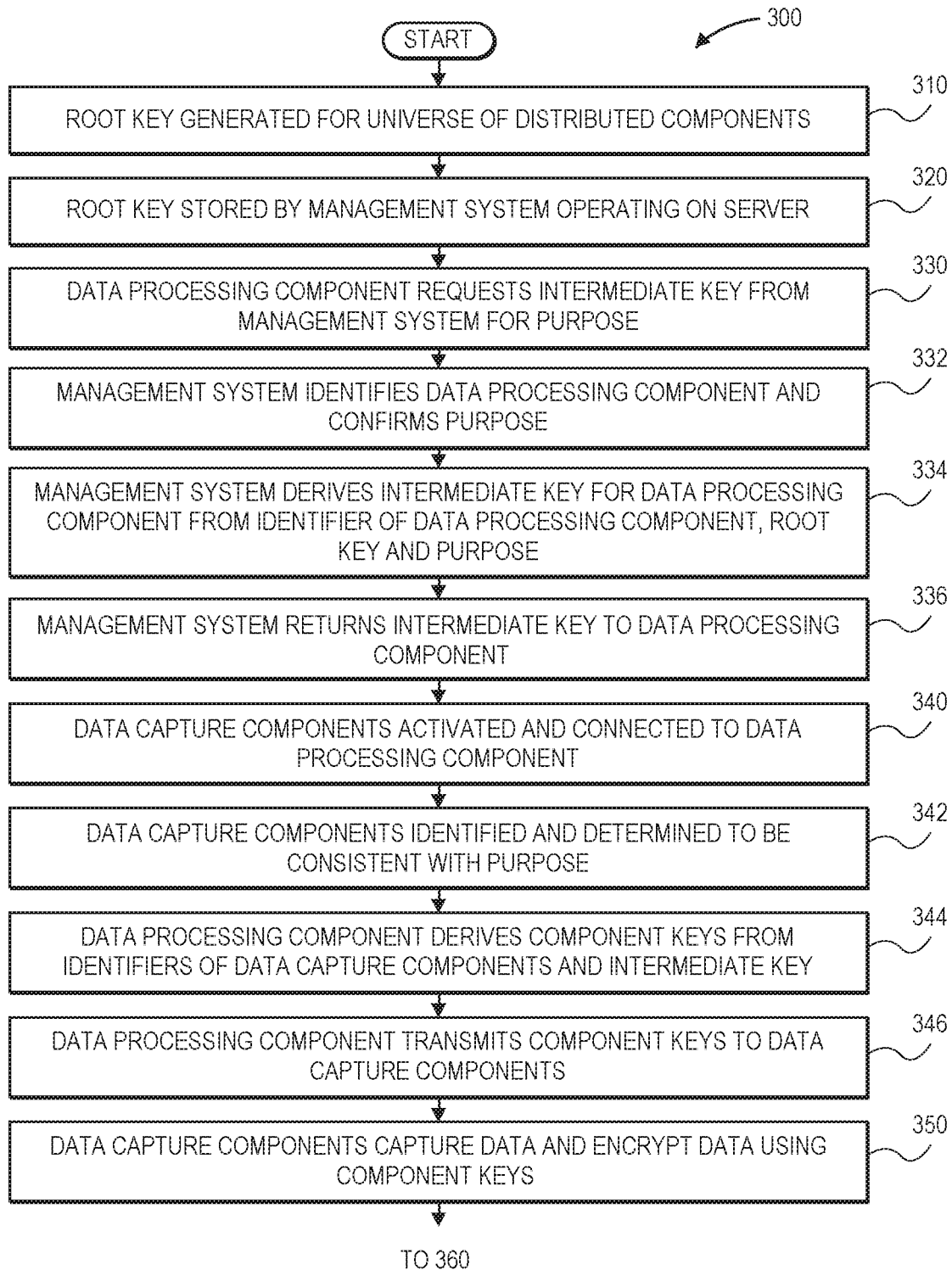
FIGS. 3A and 3B are a flow chart of one process for cryptographic key derivation in accordance with implementations of the present disclosure.
Figure 3B:
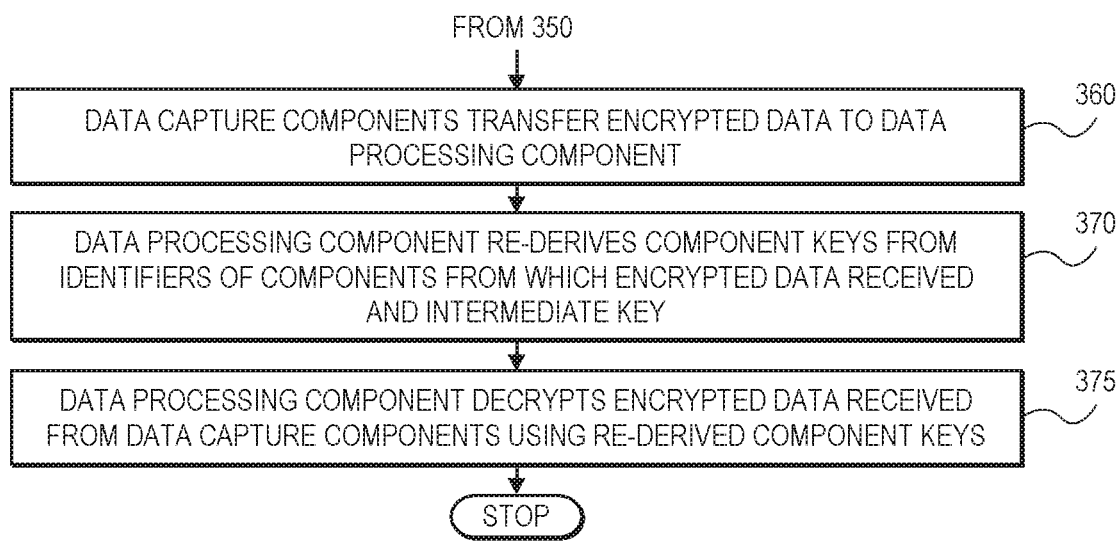

Referring to FIGS. 3A and 3B, a flow chart 300 of one process for decentralized key derivation in accordance with implementations of the present disclosure is shown. At box 310, a root key is generated for a universe of distributed components. In some implementations, the root key may be a sufficiently long string of alphanumeric characters (e.g., thirty-two raw bytes), which may be randomly generated according to any protocol, such as a Secure Shell (or "SSH") protocol.

At box 320, the root key is stored by a management system operating on a server. For example, the root key may be stored by one or more agents or applications within one or more files, records or other spaces on one or more data stores associated with the server. Alternatively, the management system may operate on any type of computing device, including but not limited to a network computer, a cloud computing device, a mainframe computer, or any like computing system or machine. In some implementations, the management system may operate on a cluster, cloud, farm, or other grouping of multiple devices that coordinate operations to provide load balancing, failover support, parallel processing capabilities, shared storage resources, or other aspects on behalf of the management system or any other systems operating thereon.

At box 330, a data processing component requests an intermediate key from the management system for a specific purpose. The data processing component may be constructed or designated for performing the specific purpose, which may relate to any function or application involving or requiring the processing of data, or for any other purpose or multiple purposes. For example, the data processing component may be configured to process audio or video signals captured by one or more cameras, microphones or other sensors, or any other data regarding any type or form of transactions or occurrences.

Additionally, the management system may be provided in the same physical location as the data processing component, or in one or more alternate or virtual locations, e.g., in a "cloud"-based environment. The data processing component may request the intermediate key from the management system in any manner and on any schedule or at any frequency, such as by making a TLS connection to an application programming interface (or "API") of the management system. For example, in some implementations, the data processing component may request the intermediate key as a single, one-time request, or as a running or standing request, e.g., in accordance with a predetermined schedule, such as on an hourly or daily basis. A request for an intermediate key, or a schedule by which intermediate keys are requested, may coincide with the generation of the root key at box 310, or a schedule by which root keys are generated, or with any other events or occurrences.

At box 332, the management system identifies the data processing component and confirms that the purpose is legitimate. For example, the request for the intermediate key may include an identifier of the data processing component, or metadata by or from which the data processing component may be identified. Additionally, the data processing component may be identified or registered as being authorized to perform or capable of performing the specific purpose, e.g., in a record or other file.

At box 334, the management system derives an intermediate key for the data processing component from an identifier of the data processing component, the root key generated at box 310, and the purpose specified by the data processing component at box 330. For example, in some implementations, the management system may perform a hash function on the root key and a string or other set of characters associated with the purpose for which the data processing component is to be provided, e.g., the processing of audio signals, video signals, or any other data, and the intermediate key may be generated based on an output received from the hash function. Alternatively, in some implementations, the hash function may consider any other information or data in the derivation of the intermediate key for the data processing component, including but not limited to additional strings or other sets of characters for incorporating entropy into the intermediate key, or enhancing a level of entropy of the intermediate key, such as an initialization vector, as well as identifiers or labels of dates or times at which the intermediate key was generated or for which the intermediate key will remain valid. In some other implementations, the hash function may consider identifiers of physical locations of the data processing component (e.g., buildings, structures or other facilities, or locations of such buildings, structures or other facilities), or hierarchical identifiers of the data processing component, as well as physical locations or hierarchical identifiers of other components (e.g., classes of such components) with which the data processing component may be associated.

At box 336, the management system returns the intermediate key to the data processing component. For example, the management system may provide the intermediate key to the data processing component via the same API by which the data processing component requested the intermediate key, or in any other manner.

At box 340, one or more data capture components are activated and connected to the data processing component. For example, the data capture components may be individually or collectively connected to the data processing component, e.g., in a peer-to-peer manner, by one or more wired or wireless connections. The data capture components may perform one or more start-up or initialization procedures, and may connect to the data processing component or the management system as a result of one or more of such procedures. Alternatively, the data capture components may be connected to the data processing component by way of a common network, or by way of a common portion of a network, and need not be directly connected to one another.

At box 342, the data capture components are identified and determined to be consistent with the purpose specified by the data processing component at box 330. For example, where the data processing component has a designated purpose of processing audio signals, the data capture components may be identified as microphones or other acoustic sensors. Where the data processing component has a designated purpose of processing video signals, the data capture components may be identified as cameras or other video sensors. The data capture components may be identified as consistent (e.g., compatible) with the data processing component based on their respective identifiers, serial numbers, classifications or any other labels. In some implementations, the data capture components may be identified by a system other than the data processing component, e.g., the management system, such as by a TLS connection to an application programming interface (or "API") of the other system.

At box 344, the data processing component derives component keys from identifiers of the data capture components and the intermediate key received from the management system at box 336. For example, the data processing component may perform hash functions on the intermediate key and one or more strings or other set of characters associated with the respective data capture components, e.g., identifiers of such components, and may derive component keys for each of the data capture components based on outputs received from the respective hash functions. Alternatively, in some implementations, the hash function may consider any other additional information or data in the derivation of the component keys for the data capture components, e.g., additional strings or other sets of characters for incorporating entropy into the component keys, or enhancing a level of entropy of the component keys, as well as identifiers or labels of dates or times at which the component keys were generated or for which the component keys will remain valid.

In some other implementations, the hash function may consider identifiers of physical locations of the respective data capture components (e.g., buildings, structures or other facilities, or locations of such buildings, structures or other facilities), or hierarchical identifiers of the data capture components. Alternatively, or additionally, a component key may be generated for any other type of component by the data processing component. In some implementations, such as where the management system is aware that the data processing component will be associated with or configured to process data captured by each of the data capture components, the intermediate key and each of the component keys may be generated by one or more systems that are external to both of the data processing component and the data capture components, such as the management system, e.g., by TPS connections to APIs of the management system by the data processing component and the data capture components.

At box 346, the data processing component transmits the component keys to the data capture components, e.g., via the same API by which a data capture component connected to the data processing component, or in any other manner. Alternatively, the component keys may be transmitted to the data capture components by any other systems, e.g., the management system.

At box 350, the data capture components capture data and encrypt the data using the component keys received from the data processing component. For example, the data capture components may be aligned or configured to capture imaging data (e.g., visual or depth images), acoustic data (e.g., sound signals), electronic messages, or any other information or data, using one or more sensors of any type or form, and at any interval. Once the data is captured by a data capture component, or simultaneously as the data is captured, the data may be encrypted by the component key assigned to the data capture component, and stored in association with one or more metadata parameters, which may identify the data capture component, or an association between the data capture component and the data processing component. For example, in some implementations, the data may be captured according to an envelope encryption scheme, or any other type or form of encryption scheme.

At box 360, the data capture components transfer the encrypted data to the data processing component. The encrypted data may be transferred to the data processing component in real time or in near-real time, either synchronously or asynchronously, or in one or more batch transmissions, over one or more networks or in any other manner. Alternatively, in some implementations, the data capture components may store the encrypted data on one or more external or removable data stores, e.g., one or more flash drives, volatile hard drives, or any other devices, and the encrypted data may be physically migrated to the data processing component according to any data transport solution.

At box 370, the data processing component re-derives the component keys of the data capture components from which encrypted data was received based on the identifiers of such data capture components and the intermediate key. For example, the data processing component may perform the same hash functions on the intermediate key and one or more strings or other set of characters associated with the respective data capture components, e.g., identifiers of such components, that were performed to derive the component keys at box 344. The component keys may be derived from outputs received from the hash functions.

At box 375, the data processing component decrypts the data received from the data capture components using the re-derived component keys, and the process ends.

Alternatively, in some implementations, one or more intermediate keys may be derived for a processing component at the same time that (e.g., in parallel with) one or more component keys are derived for capture components based on such intermediate keys. For example, where an intermediate key, or strings or other sets of data from which the intermediate key is to be derived, are known, one or more component keys may be derived for capture components that are configured to capture information or data to be processed or interpreted by the processing components, e.g., according to one or more of the same or similar hash functions.

Moreover, a processing component may derive any type or form of cryptographic key for any type or form of device or component, and need not be limited to the derivation of a cryptographic key of a device or component that is configured to capture data or encrypt the data captured thereby. For example, one data processing component may derive cryptographic keys (e.g., intermediate keys) for any number of other data processing components, which may be further configured to derive cryptographic keys (e.g., device keys, or component keys) for any number of data capture components (or other components). Thus, each of the other data processing components may be configured to decrypt data that was captured and encrypted by the data capture components for which each of such data processing components derived component keys. The data processing component that generated the intermediate keys for the other data processing components, however, may also be configured to decrypt data that was captured and encrypted by any of the data capture components.

Furthermore, in some implementations, cryptographic keys (e.g., device keys, or component keys) may be generated by a central system, e.g., a management system, on behalf of one or more data capture devices or components based on an intermediate key and any other information or data (e.g., identifiers) regarding the data capture components. Subsequently, the intermediate key be provided to a data processor component, which may then be permitted to decrypt the data captured by the data capture components, and process the data accordingly. For example, each of the data capture components may be configured to capture data in a specific region or domain, and to encrypt the data with a device key (or a component key) derived by a management system specifically for each of such components based on an intermediate key, even before that intermediate key is provided to a data processing component. Subsequently, a data processing component may connect to a network with one or more of the data capture components, e.g., either initially or as a replacement for another data processing components, and request a cryptographic key for decrypting data within the specific region or domain from the management system, which may provide the intermediate key to the data processing component. Subsequently, the data processing component may receive the encrypted data from the respective ones of the data capture components, and may decrypt and process the encrypted data using the intermediate key received from the management system.

As is discussed above, a cryptographic key may be derived for a processing component or for capture components in multiple layers or at multiple levels, and based on one or more attributes or identifiers of the processing component or the capture components with which the processing component is or will be associated. For example, a cryptographic key (e.g., an intermediate key) may be derived for a processing component based on a root key and one or more attributes or identifiers such as an identifier of a purpose for which the processing component is provided, one or more vectors or other strings for increasing a level of entropy of the intermediate key, values associated with a time at which the intermediate key will be valid or a duration for which the intermediate key is to remain valid, identifiers of physical or virtual locations or domains of the processing component or the capture components, or any other attributes or identifiers. Similarly, cryptographic keys (e.g., device keys or component keys) may be derived for capture components based on a cryptographic key of a processing component, along with one or more attributes or identifiers of the respective capture components.

Figure 4:
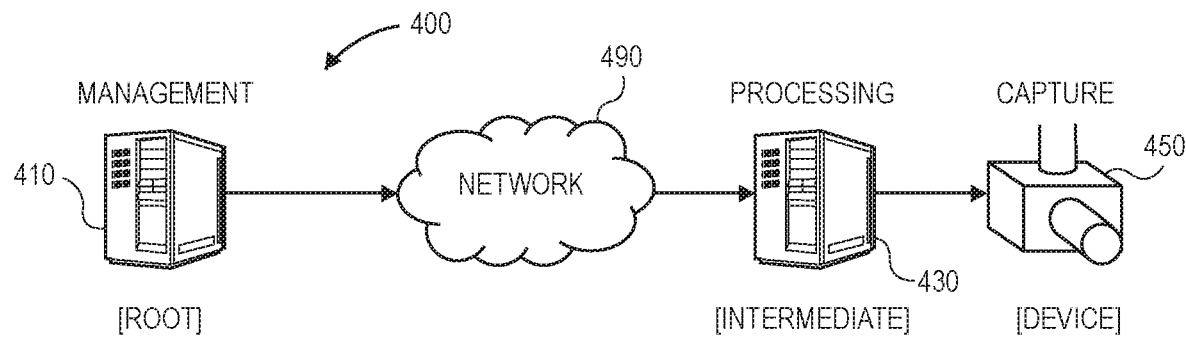
FIG. 4 is a view of aspects of one system for cryptographic key derivation in accordance with implementations of the present disclosure.

Referring to FIG. 4, a view of aspects of one system 400 for cryptographic key derivation in accordance with implementations of the present disclosure is shown. Except where otherwise noted, reference numerals preceded by the number "4" in FIG. 4 refer to elements that are similar to elements having reference numerals preceded by the number "2" in FIG. 2 or by the number "1" shown in FIGS. 1A through 1E.

As is shown in FIG. 4, the system 400 includes a management system 410, a processing component 430 and a capture component 450 (viz., a camera). The management system 410 and the processing component 430 are connected to one another over a network 490, which may include the Internet in whole or in part. The capture component 450 is connected to the processing component 430 in a wired or wireless manner. In some implementations, the system 400 may further include any number of processing components, and any number of capture components associated with each of such processing components.

As is also shown in FIG. 4, the management system 410 is configured to derive a cryptographic key, viz., KEY-0, according to a hash-based message authentication code (or "HMAC") function, or any other cryptographic function based on a root key, viz., [ROOT-KEY], generated by the management system 410 at random or in any other manner and an identifier of a purpose for which one or more processing components or capture components, viz., the processing component 430 or the capture component 450, is provided, e.g., image processing, object detection or recognition, acoustic processing, cybersecurity, fraud detection, finance, medicine, or others. For example, the root key may be a sufficiently long string of alphanumeric characters that is randomly generated according to any protocol, e.g., a Secure Shell (or "SSH") protocol. The cryptographic key KEY-0 may be derived by cryptographically hashing or otherwise combining the root key and the identifier of the purpose for which the processing component 430 or the capture component 450 is provided. Alternatively, the cryptographic key KEY-0 may be derived based on any other attribute or identifier of the processing component 430 or the capture component 450.

Once derived, the cryptographic key KEY-0 may be used as an intermediate key for the processing component 430, e.g., to derive cryptographic keys for the capture component 450, or for one or more other capture components (not shown). In some implementations, however, the cryptographic key KEY-0 may be further processed along with one or more attributes or identifiers of the processing component 430 or the capture component 450, or any other strings, according to an HMAC function or any other cryptographic function, to derive one or more cryptographic keys for the processing component 430 or the capture component 450. By further deriving additional keys from the cryptographic key KEY-0 using other cryptographic keys and attributes or identifiers of components from a cryptographic function, the system 400 may further reduce the likelihood of collisions (e.g., where two different inputs to the cryptographic function result in the same output), or increase a level of entropy associated with an output received from the cryptographic function.

For example, as is shown in FIG. 4, a cryptographic key KEY-1 may be derived based on the cryptographic key KEY-0 and an initialization vector ("[IV]") according to an HMAC function. Likewise, as is also shown in FIG. 4, a cryptographic key KEY-2 may be derived based on the cryptographic key KEY-1 and an identifier of a date on which the cryptographic key KEY-1 was generated or a date on which the cryptographic key KEY-2 will be valid ("YYYYMMDD," or four digits corresponding to a year, two digits corresponding to a month, and two digits corresponding to a day), according to an HMAC function. Alternatively, the cryptographic key KEY-2 may be derived based on the cryptographic key KEY-1 and a duration for which the cryptographic key KEY-2 is to remain valid.

As is further shown in FIG. 4, a cryptographic key KEY-3 may be derived based on the cryptographic key KEY-2 and an identifier of a time, such as a number of seconds ("SS") at which the cryptographic key KEY-2 was generated, or a duration for which the cryptographic key KEY-3 will be valid, according to an HMAC function. As is also shown in FIG. 4, a cryptographic key KEY-4 may be derived based on the cryptographic key KEY-3 and an identifier of a building, a structure or a facility within which the processing component 430 or the capture component 450 is to be provided ("FACILITY"), according to an HMAC function. Additionally, as is shown in FIG. 4, a cryptographic key KEY-5 may be derived based on the cryptographic key KEY-4 and an identifier of a region or space within the building, structure or facility where the processing component 430 or the capture component 450 will be utilized ("REGION"), according to an HMAC function.

A cryptographic key for the processing component 430, viz., [INTERMEDIATE], may be derived based on the cryptographic key KEY-5 and an identifier of a domain with which the processing component 430 is to be associated, according to an HMAC function. The cryptographic key INTERMEDIATE KEY may be securely stored by the processing component 430.

As is also shown in FIG. 4, a cryptographic key for the capture component 450, viz., [DEVICE], may be derived based on the cryptographic key [INTERMEDIATE] and an identifier of the capture component 450, according to an HMAC function. The processing component 430 provides the cryptographic key to the capture component 450, where the cryptographic key is securely stored in one or more memory components. Subsequently, the capture component 450 may capture data, and encrypt the captured data using the cryptographic key DEVICE KEY. The encrypted data may then be transferred to the processing component 430 along with metadata identifying the capture component 450, or an association of the capture component 450 and the processing component 430. After receiving the encrypted data and the metadata, the processing component 430 may derive the cryptographic key [DEVICE] for the capture component 450 again, based on the cryptographic key [INTERMEDIATE] and the identifier of the capture component 450 and according to an HMAC function, and use the cryptographic key [DEVICE] to decrypt the encrypted data.

As is discussed above, a root key may be randomly generated at a regular interval (e.g., once daily) by a management system or other computer system, and cryptographic keys may be derived for one or more processing components and capture components based on the root key at regular sub-intervals within the interval.

Figure 5:
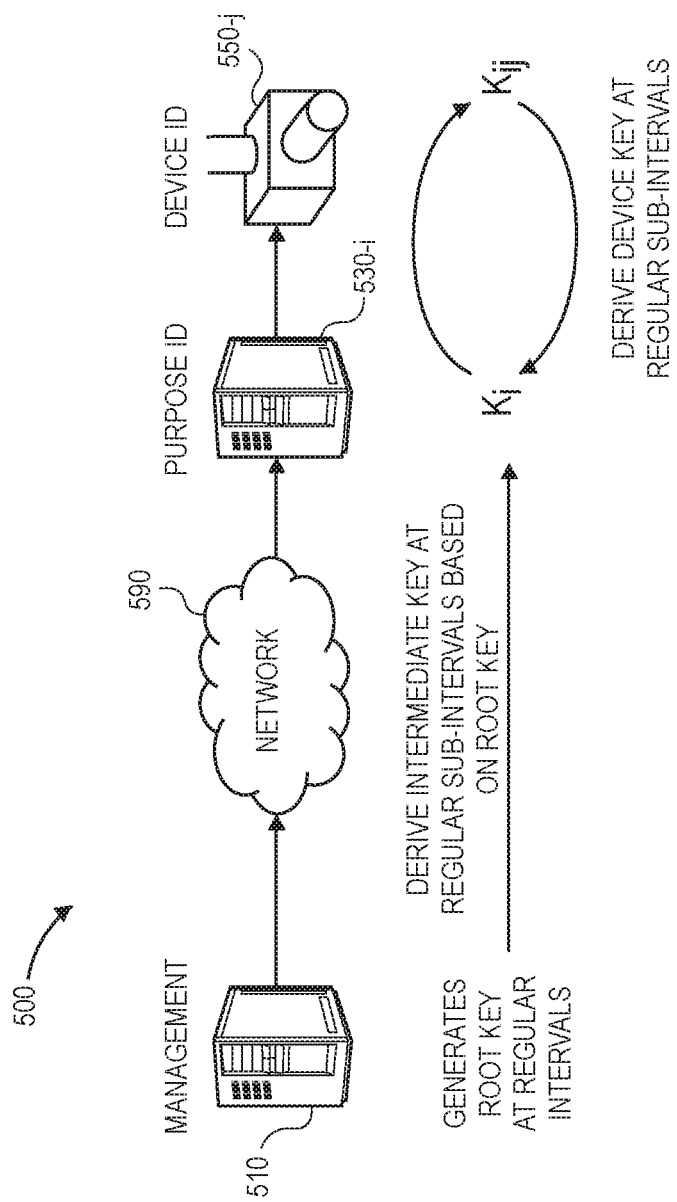
FIG. 5 is a view of aspects of one system for cryptographic key derivation in accordance with implementations of the present disclosure.

Referring to FIG. 5, a view of aspects of one system 500 for cryptographic key derivation in accordance with implementations of the present disclosure is shown. Except where otherwise noted, reference numerals preceded by the number "5" in FIG. 5 refer to elements that are similar to elements having reference numerals preceded by the number "4" in FIG. 4, by the number "2" in FIG. 2 or by the number "1" shown in FIGS. 1A through 1E.

As is shown in FIG. 5, the system 500 includes a management system 510 and a data processing component 530-$i$ connected to one another over a network 590, which may include the Internet, in whole or in part. A data capture component 550-$j$, e.g., a camera such as a visual camera, a depth camera, an infrared camera, or another type or form of camera, is connected to the data processing component 530-$i$ via wired or wireless connections. For example, in some implementations, the data capture component 550-$j$ may be connected to the data processing component via a peer-to-peer network, such as according to one or more wireless protocols, standards or specifications such as Bluetooth® or any Wi-Fi protocol. Alternatively, in some other implementations, the data capture component 550-$j$ may be connected to the data processing component 530-$i$ via the network 590, and may be configured to capture any other type or form of information or data, including but not limited to imaging data, over the network 590.

As is also shown in FIG. 5, the management system 510 may generate a root key for a universe of devices, which may include the data processing component 530-$i$, the data capture component 550-$j$, or any others (not shown). The root key may be a string of alphanumeric characters of any length (e.g., thirty-two raw bytes) and may be generated randomly or in any other manner at a regular interval, such as once per day, e.g., at the same or similar times within the regular interval, or at any time within the regular interval. The root key is provided to the data processing component 530-$i$ over the network 590, and an intermediate key K (e.g., a cryptographic key) may be derived for the data processing component 530-$i$ based on the root key and one or more attributes or identifiers of the data processing component 530-$i$. The intermediate key K may be derived by the management system 510 (or by any other system) at a regular sub-interval (e.g., an interval within the regular interval at which root keys are generated by the management system 510) according to a cryptographic function, such as an HMAC function, and provided to the data processing component 530-$i$ over the network 590, thereby enabling the root key to remain securely stored by the management system 510.

As is further shown in FIG. 5, the data processing component 530-$i$ may derive device keys (or component keys) for the data capture component 550-$j$, or any number of other data capture components (not shown) that may be connected to the data processing component 530-$i$. For example, at a regular sub-interval (e.g., an interval within the regular interval at which root keys are generated by the management system 510, or within the regular sub-interval at which the intermediate key K is derived), the data processing component 530-$i$ may derive a device key $K_{ij}$ for the data capture component 550-$j$ according to a cryptographic function, such as an HMAC function, based on the intermediate key K and one or more attributes or identifiers of the data capture component 550-$j$. In some implementations, when deriving the device key $K_{ij}$, the cryptographic function may consider not only the intermediate key K derived for the data capture component 550-$j$ but also one or more attributes or identifiers of the times at which the device key $K_{ij}$ will be valid, or a duration for which the device key $K_{ij}$ is to remain valid, or any other attributes or identifiers associated with the data capture component 550-$j$.

Figure 6A:
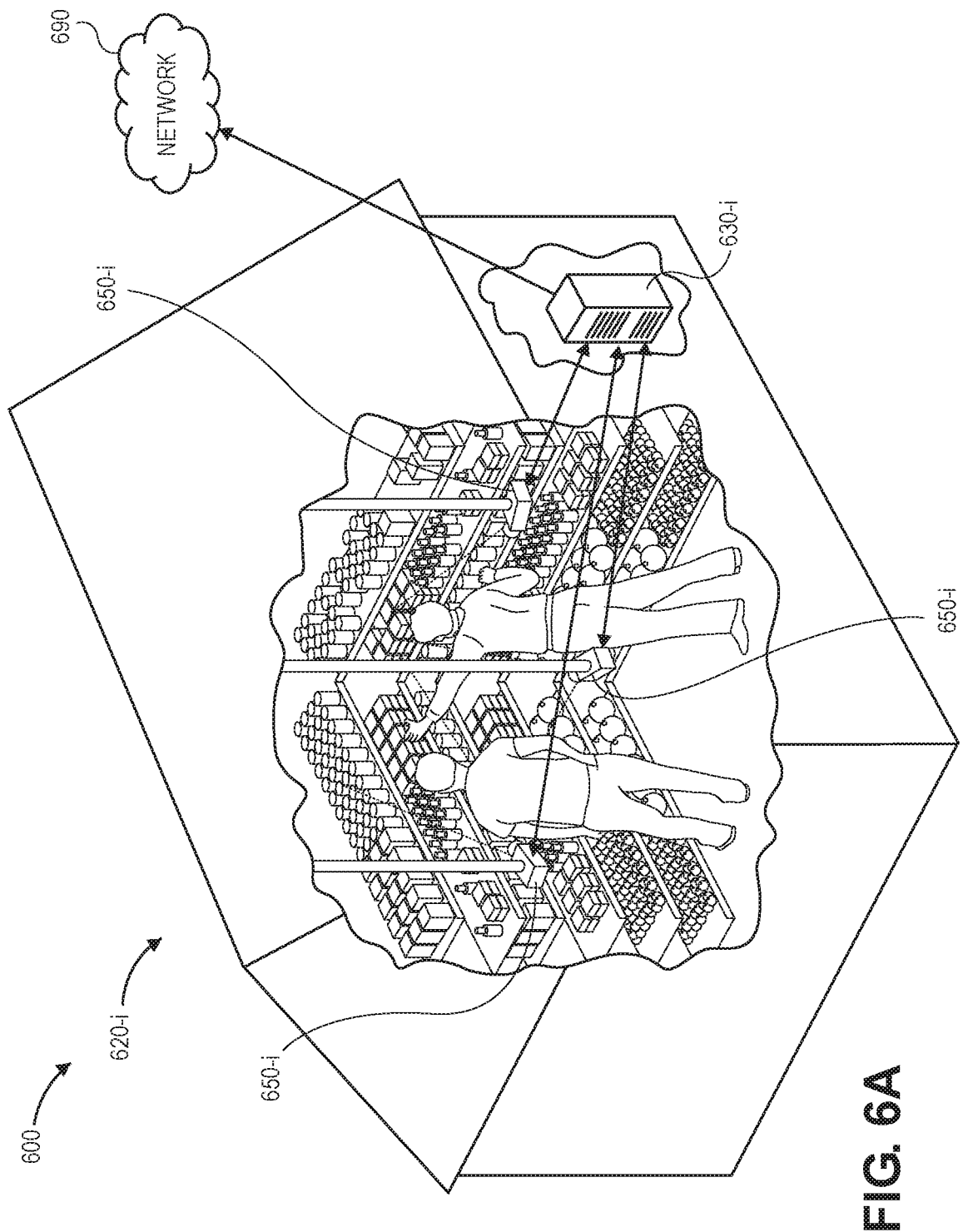
FIGS. 6A and 6B are views of aspects of one system for cryptographic key derivation in accordance with implementations of the present disclosure.
Figure 6B:
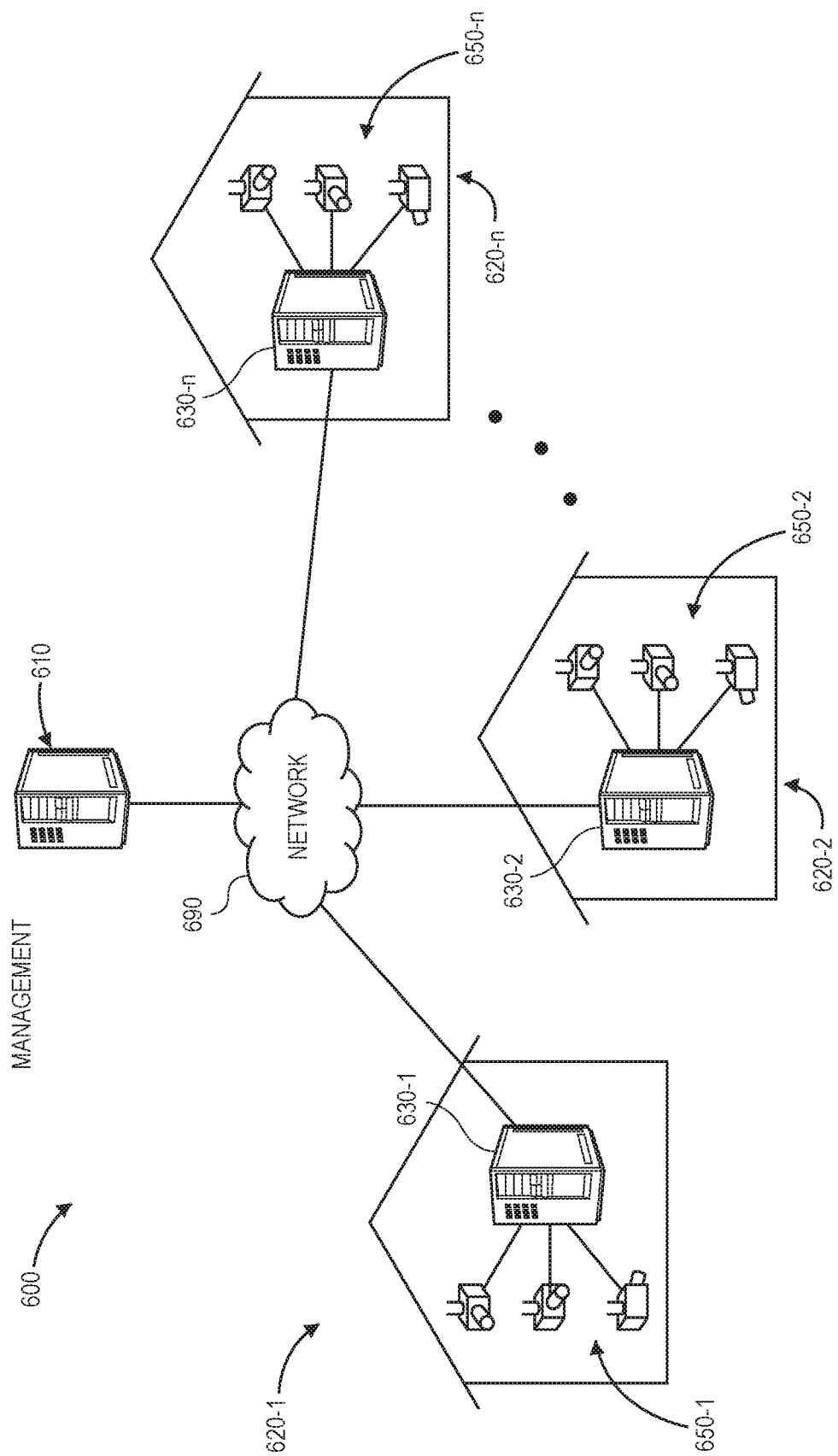

The sub-intervals at which the intermediate key K or the device key $K_{ij}$ is derived may have any length, and may be shorter than the interval at which the root key is generated by the management system 510, e.g., once every minute, five minutes, ten minutes, thirty minutes or sixty minutes. The intermediate key K may be derived based on a then-valid or the then-prevailing root key, and the device key $K_{ij}$ may be derived based on a then-valid or then-prevailing intermediate key $K_i$. Device keys may be derived for other data capture components that are associated with the data processing component **530-*i* (not shown) at the same regular sub-interval, or at different sub-intervals, within the regular interval at which the root keys are generated by the management system 510**.

Where a distributed system includes multiple data processing components, each having one or more data capture components associated therewith, deriving cryptographic keys for data capture components based on cryptographic keys derived for data processing components with which the data capture components are associated ensures that a breach or loss of secure control of data at or by one of the components of the distributed system does not infect all of the components of the distributed system, or subject their respectively captured or processed data to risk of loss. Referring to FIGS. 6A and 6B, views of aspects of one system 600 for cryptographic key derivation in accordance with implementations of the present disclosure are shown. Except where otherwise noted, reference numerals preceded by the number "6" in FIGS. 6A and 6B refer to elements that are similar to elements having reference numerals preceded by the number "5" in FIG. 5, by the number "4" in FIG. 4, by the number "2" in FIG. 2 or by the number "1" shown in FIGS. 1A through 1E.

As is shown in FIG. 6A, a representative facility **620-*i* (e.g., a materials handling facility) includes a data processing component 630-*i* (e.g., a server, a desktop computer, a laptop computer, a mobile device, or any other computer devices or systems) and a plurality of cameras 650-*i* or other data capture components. The cameras 650-*i* may be mounted in any location or orientation within the facility 620-*i*, e.g., above, alongside, near or to one or more storage units or other structures within the facility 620-*i* having any number of items on shelves therein. The cameras 650-*i* may be configured to capture images of one or more actors (e.g., customers, workers, associates or others) within the facility 620-*i*, and to locate such actors or identify one or more transactions or events occurring within the facility 620-*i*. In accordance with implementations of the present disclosure, each of the cameras 650-*i* may be programmed or otherwise configured to capture imaging data, as well as any number of acoustic signals, messages or other information, data, or metadata, and to encrypt the captured data using a cryptographic key (e.g., a device key or a component key) specifically derived for the respective cameras 650-*i* by the data processing component 630-*i*. The cryptographic keys for each of the cameras 650-*i* may be derived based on a cryptographic key that was derived for the data processing component 630-*i*, according to an HMAC function, or any other cryptographic function. Upon receiving encrypted data from each of the cameras 650-*i*, the data processing component 630-*i* may decrypt the encrypted data by deriving the cryptographic key that was used by the respective cameras 650-*i*** to encrypt the data, and process the data accordingly.

As is shown in FIG. 6B, the system 600 includes a management system 610 and a plurality of facilities **620-1, 620-2 . . . 620-*n*. Each of the facilities 620-1, 620-2 . . . 620-*n* includes a data processing component 630-1, 630-2 . . . 630-*n* connected to the management system 610 over a network 690. Additionally, each of the facilities 620-1, 620-2 . . . 620-*n* further includes a plurality of cameras 650-1, 650-2 . . . 650-*n* connected to the data processing component 630-1, 630-2 . . . 630-*n***, e.g., by one or more wired or wireless connections.

In accordance with implementations of the present disclosure, each of the data processing components **630-1, 630-2 . . . 630-*n* within one of the facilities 620-1, 620-2 . . . 620-*n* may receive cryptographic keys that are specifically derived by the management system 610 based on a randomly generated root key and one or more attributes or identifiers of the respective data processing components 630-1, 630-2 . . . 630-*n*, e.g., according to a cryptographic function, such as an HMAC function. Each of the data processing components 630-1, 630-2 . . . 630-*n* may further derive cryptographic keys for each of the plurality of cameras 650-1, 650-2 . . . 650-*n* within the respective facilities 620-1, 620-2 . . . 620-*n* in a similar manner, e.g., based on the cryptographic key derived for the specific one of the data processing components 630-1, 630-2 . . . 630-*n* and one or more attributes or identifiers of the respective cameras 650-1, 650-2 . . . 650-*n*, and according to a cryptographic function, such as an HMAC function. Subsequently, the cameras 650-1, 650-2 . . . 650-*n* may capture imaging data within the respective facilities 620-1, 620-2 . . . 620-*n* and encrypt the imaging data using their respectively derived cryptographic keys, before forwarding the encrypted data and metadata to the corresponding data processing component 630-1, 630-2 . . . 630-*n***.

Likewise, upon receiving encrypted data and metadata from the respective cameras **650-1, 650-2 . . . 650-*n*, each of the data processing components 630-1, 630-2 . . . 630-*n* may identify the respective cameras 650-1, 650-2 . . . 650-*n* that captured the encrypted data, and decrypt the encrypted data by re-deriving the cryptographic keys that the cameras 650-1, 650-2 . . . 650-*n* used to encrypt the data. Conversely, none of the data processing components 630-1, 630-2 . . . 630-*n* may decrypt or process any of the encrypted data captured by any of the cameras 650-1, 650-2 . . . 650-*n* in other facilities 620-1, 620-2 . . . 620-*n***.

By deriving cryptographic keys for devices within a given one of the facilities **620-1, 620-2 . . . 620-*n*, and limiting the validity of the cryptographic keys to devices within the corresponding facilities 620-1, 620-2 . . . 620-*n*, the systems and methods of the present disclosure may ensure that data captured by one or more of the cameras 650-1, 650-2 . . . 650-*n* within a given one of the facilities 620-1, 620-2 . . . 620-*n*, and processed by one or more of the data processing components 630-1, 630-2 . . . 630-*n*, may be securely stored and processed at a granular level. Similarly, by requiring the cryptographic keys to be re-derived by the respective data processing components 630-1, 630-2 . . . 630-*n* that received the encrypted data from the cameras 650-1, 650-2 . . . 650-*n* prior to decryption, a breach or loss of secure control of data within one of the facilities 620-1, 620-2 . . . 620-*n* will not infect all of the components of the system 600, including but not limited to the data processing components 630-1, 630-2 . . . 630-*n* or the cameras 650-1, 650-2 . . . 650-*n* of the other facilities 620-1, 620-2 . . . 620-*n***.

In some implementations, the systems and methods of the present disclosure may also be used to properly identify or authenticate a component (e.g., a processing component or a capture component) as a member of a distributed system. For example, where a first cryptographic key is derived for a first component, e.g., based on a root key and one or more attributes or identifiers of the first component, and is used to further derive a second cryptographic key for a second component, e.g., based on the first cryptographic key and one or more attributes or identifiers of the second component, the first component and the second component may be identified as associated with one another, or with a management system that generated the root key, based on their respective cryptographic keys, such as by rederiving cryptographic keys of one or both of the first component or the second component.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, as used herein, the systems and methods of the present disclosure are not limited to use in connection with information or data captured by imaging devices (e.g., cameras) or acoustic sensors (e.g., microphones), and may be utilized in connection with any type or form of information or data captured by any type or form of device. Additionally, those of ordinary skill in the pertinent arts will recognize that the terms "component key" or "device key," when used herein, to refer to cryptographic keys (e.g., encryption keys) derived for devices or components that are primarily or typically configured to capture data, are used interchangeably herein. Likewise, the term "intermediate key," when used herein, refers to a cryptographic key (e.g., a decryption key) that is derived for a system that is primarily or typically configured to receive data from one or more devices or components.

Furthermore, the systems and methods of the present disclosure may be utilized in any number of applications in data capture components and/or data processing components are required or desired, such as within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, restaurants, convenience stores, gasoline stations, wholesale stores, museums, or other facilities or combinations of facilities for performing one or more functions of material or inventory handling for any purpose. For example, in some implementations, the systems and methods disclosed herein may be used to securely capture, process and/or store information or data regarding transactions or occurrences within a materials handling facility, as well as within one or more transportation centers, financial institutions or like structures in which diverse collections of people, objects or machines may enter and exit from such environments at regular or irregular times or on predictable or unpredictable schedules. Uses of any of the implementations of the present disclosure are not limited to the specific implementations described herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIGS. 3A and 3B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
a first computer device provided within a materials handling facility, wherein the first computer device is connected to a network; and
a plurality of cameras provided within the materials handling facility, wherein each of the plurality of cameras is in communication with the first computer device,
wherein the first computer device is programmed with computer-executable instructions that, when executed, cause the first computer device to at least:
receive a first cryptographic key from a second computer device over the network wherein the first cryptographic key is derived for the first computer device from a root key generated by the second computer device;
derive cryptographic keys for each of the plurality of cameras, wherein each of the cryptographic keys is derived according to a cryptographic function based at least in part on the first cryptographic key and an identifier of one of the cameras;
distribute the cryptographic keys to the plurality of cameras, wherein each of the cryptographic keys is distributed to one of the cameras, and wherein a second cryptographic key derived according to the cryptographic function based at least in part on the first cryptographic key and a first identifier of a first camera of the plurality of cameras is one of the cryptographic keys distributed to the first camera;
receive first imaging data from the first camera;
in response to receiving the first imaging data,
derive that the first imaging data was received from the first camera;
derive at least a third cryptographic key according to the cryptographic function based at least in part on the first cryptographic key and the first identifier;
decrypt the first imaging data received from the first camera based at least in part on the third cryptographic key;
store the decrypted first imaging data on the first computer device; and
process the decrypted first imaging data to detect at least one object depicted within the first imaging data.

2. The system of claim 1, wherein a fourth cryptographic key derived according to the cryptographic function based at least in part on the first cryptographic key and a second identifier of a second camera of the plurality of cameras is one of the cryptographic keys distributed to the second camera, and
wherein the computer-executable instructions, when executed, further cause the first computer device to at least:
receive second imaging data from the second camera;
in response to receiving the second imaging data,
determine that the second imaging data was received from the second camera;
derive at least a fifth cryptographic key according to the cryptographic function based at least in part on the first cryptographic key and the second identifier, wherein the fifth cryptographic key is not the third cryptographic key;
decrypt the second imaging data received from the second camera based at least in part on the fifth cryptographic key;
store the decrypted second imaging data on the first computer device; and
process the decrypted second imaging data to detect at least one object depicted within the second imaging data.

3. The system of claim 1, wherein the root key is a string of characters of at least thirty-two raw bytes randomly generated by the second computer device at a first interval,
wherein the cryptographic function is a hash-based message activation code function,
wherein the cryptographic keys are derived for each of the plurality of cameras at a second interval, and
wherein the second interval is shorter than the first interval.

4. The system of claim 1, wherein the cryptographic function derives the cryptographic keys for the plurality of cameras based at least in part on the first cryptographic key, the identifier of the one of the cameras, and one or more of:
a date or a time that the cryptographic keys are valid;
a duration for which the cryptographic keys are valid;
an identifier of a facility in which one of the first computer device and the plurality of cameras are provided;
an identifier of a region in which the materials handling facility is located; or
an identifier of a domain of at least the first computer device and the plurality of cameras.

5. A method comprising:
deriving, by a first computer device provided within a facility, a first cryptographic key for a first capturing component provided within the facility, wherein the first cryptographic key is derived for the first capturing component at a first time based at least in part on a second cryptographic key derived for at least the first computer device by a second computer device and at least one of an attribute or an identifier of the first capturing component, and wherein the second computer device is not provided within the facility;
transmitting, by the first computer device, the first cryptographic key to the first capturing component;
capturing first data by the first capturing component;
encrypting, by the first capturing component, the first data using the first cryptographic key;
transmitting, by the first capturing component, the encrypted first data to the first computer device;
receiving, by the first computer device, the encrypted first data from the first capturing component; and
in response to receiving the encrypted first data,
determining, by the first computer device, the at least one of the attribute or the identifier of the first capturing component;
deriving, by the first computer device, a third cryptographic key for the first capturing component at a second time, wherein the third cryptographic key is derived based at least in part on the second cryptographic key and the at least one of the attribute or the identifier of the first capturing component, and wherein the second time follows the first time; and
decrypting, by the first computer device, the encrypted first data using the third cryptographic key.

6. The method of claim 5, further comprising:
generating, by a second computer device, a root key for a system comprising the first computer device and the second computer device;
deriving, by the second computer device, the second cryptographic key for at least the first computer device based at least in part on the root key and at least one of an identifier or an attribute of the first computing device;
transmitting, by the second computer device, the second cryptographic key to the first computer device over a network; and
receiving, by the first computer device, the second cryptographic key from the second computer device prior to the first time.

7. The method of claim 6, further comprising:
deriving, by the first computer device, a fourth cryptographic key for a second capturing component provided within the facility, wherein the fourth cryptographic key is derived for the second capturing component based at least in part on the second cryptographic key and at least one of an attribute or an identifier of the second capturing component;
transmitting, by the first computer device, the fourth cryptographic key to the second capturing component;
capturing second data by the second capturing component;
encrypting, by the second capturing component, the second data using the fourth cryptographic key;
transmitting, by the second capturing component, the encrypted second data to the first computer device;
receiving, by the first computer device, the encrypted second data from the second capturing component; and
in response to receiving the encrypted second data,
determining, by the first computer device, the at least one of the attribute or the identifier of the second capturing component;
deriving, by the first computer device, a fifth cryptographic key for the second capturing component at a fourth time, wherein the fifth cryptographic key is derived based at least in part on the second cryptographic key and at least one of the attribute or the identifier of the second capturing component, and wherein the third time follows the first time; and
decrypting, by the first computer device, the encrypted second data using the fifth cryptographic key,
wherein the fourth cryptographic key is not the first cryptographic key, and
wherein the fifth cryptographic key is not the third cryptographic key.

8. The method of claim 6, wherein the root key comprises a thirty-two raw byte string of characters randomly generated by the second computing device at a first interval.

9. The method of claim 6, wherein the second cryptographic key is derived for at least the first computer device based at least in part on the root key and the at least one of the attribute or the identifier of the first computer device according to a hash-based message activation code function.

10. The method of claim 6, wherein the first cryptographic key is derived for the first capturing component based at least in part on the second cryptographic key and the at least one of the attribute or the identifier of the first capturing component according to a hash-based message activation code function.

11. The method of claim 6, wherein the at least one of the attribute or the identifier of the first computer device comprises one or more of:

a date or a time that the second cryptographic key is valid;
a duration for which the second cryptographic key is valid;
an identifier of the facility;
an identifier of a region in which the facility is located; or
an identifier of a domain of at least the first computer device and the first capturing component.

12. The method of claim 11, wherein the second cryptographic key is derived based at least in part on an initialization vector for one of the first computer device or the first capturing component.

13. The method of claim 6, wherein the root key is generated for the system in accordance with a first interval,
wherein the first cryptographic key is derived for the first capturing component in accordance with a second interval, and
wherein the second interval is shorter than the first interval.

14. The method of claim 6, further comprising:
receiving, by the first computer device, a call to a first application programming interface from the first capturing component, wherein the call to the first application programming interface comprises the at least one of the attribute or the identifier of the first capturing component, and
wherein the first cryptographic key is derived in response to receiving the call to the first application programming interface.

15. The method of claim 14, further comprising:
receiving, by the second computer device, a call to a second application programming interface from the first computer device, wherein the call to the second application programming interface comprises the at least one of the attribute or the identifier of the first computer device, and
wherein the second cryptographic key is derived in response to receiving the call to the second application programming interface.

16. The method of claim 5, wherein the facility is a materials handling facility.

17. The method of claim 5, further comprising:
processing the first data by the first computer device,
wherein the first data is processed after the encrypted first data is decrypted by the first computer device using the third cryptographic key.

18. The method of claim 17, wherein the first capturing component is a visual camera,
wherein the first data comprises a first image, and
wherein processing the first data comprises:
providing, by the first computer device, at least the first image to at least one detection algorithm as an input;
receiving, by the first computer device, an output from the at least one detection algorithm; and
identifying, by the first computer device, at least one object depicted within the first image based at least in part on the output.

19. A system comprising:
a first computer device;
a second computer device provided in association with a materials handling facility; and
a plurality of camera devices provided within the materials handling facility, wherein each of the plurality of camera devices is in communication with the second computer device, and wherein each of the plurality of camera devices is configured to capture imaging data, and wherein the first computer device is programmed with one or more sets of instructions that, when executed by the first computer device, cause the first computer device to at least:
generate a root key for at least one computer device or at least one camera device of the system;
receive, from the second computer device, a request for a first cryptographic key, wherein the request comprises at least one of an attribute or an identifier of the second computer device;
derive, according to a hash-based message authentication code function, the first cryptographic key for at least the second computer device based at least in part on the root key and the at least one of the attribute or the identifier of the second computer device;
transmit the first cryptographic key to the second computer device;
receive, from a first camera device, encrypted imaging data and metadata, wherein the first camera device is one of the plurality of camera devices, wherein the metadata identifies the first camera device and an association between then first camera device and the second computer device, and wherein the encrypted imaging data was encrypted by the first camera device using a second cryptographic key derived by the second computer device according to a hash-based message authentication code function based at least in part on the first cryptographic key and an identifier of the first camera device;
determine the identifier of the first camera device based at least in part on the metadata;
derive, according to a hash-based message authentication code function, a third cryptographic key for the first camera device based at least in part on the first cryptographic key and the identifier of the first camera device; and
decrypt the encrypted imaging data using the third cryptographic key.

20. The system of claim 19, wherein the request for the first cryptographic key is received via a first call by the second computer device to a first application programming interface of the first computer device, and
wherein the second cryptographic key is derived in response to a second call by the first camera device to a second application programming interface of the first computer device.

* * * * *